US005770829A

United States Patent [19]
Katz et al.

[11] Patent Number: 5,770,829
[45] Date of Patent: Jun. 23, 1998

[54] GENERAL PURPOSE POSITION CONTROL SYSTEM HAVING RECURSIVE PROFILE GENERATOR

[75] Inventors: Stanley Maurice Katz, Stoughton; Francis Brian O'Neill, Canton, both of Mass.

[73] Assignee: Seiberco Incorporated, Braintree, Mass.

[21] Appl. No.: 871,370

[22] Filed: Jun. 9, 1997

[51] Int. Cl.$^6$ .............................. G05B 1/08; G05B 19/05
[52] U.S. Cl. ..................... 318/560; 318/568.18; 318/671
[58] Field of Search ..................................... 318/560, 567, 318/568.1, 568.11, 568.17, 568.18, 671

[56] References Cited

U.S. PATENT DOCUMENTS

| | | | |
|---|---|---|---|
| 4,459,525 | 7/1984 | Hasegawa | 318/561 |
| 4,988,935 | 1/1991 | York | 318/568.18 |
| 5,371,451 | 12/1994 | Toyosawa et al. | 318/568.13 |
| 5,654,619 | 8/1997 | Iwashita | 318/636 |

*Primary Examiner*—Bentsu Ro
*Attorney, Agent, or Firm*—Ira S. Dorman

[57] ABSTRACT

The recursive profile generator of a general purpose position control system relies only upon current state and target state information in generating the path of movement for the armature of the servomotor. The profile generator employs a convergent algorithm for calculating the acceleration necessary to reach each control point or target position. By ignoring previous state information, the profile generator makes the use of reduced computing power possible and readily accommodates changing target state conditions.

7 Claims, 2 Drawing Sheets

GENERAL PURPOSE POSITION CONTROL SYSTEM HAVING RECURSIVE PROFILE GENERATOR

BACKGROUND OF THE INVENTION

Computer-controlled electric motors, designed for use as components of servo systems, are of course extensively employed for a wide range of applications. Considered most basically, the function of the motion control system associated with such a "servomotor" is to apply, for a period of time, the control that is necessary to ensure that the armature of the motor reaches one or more target positions at a given instant or instants. Normally, the armature moves along a path that is defined by numerous intermediate target positions, or control points, which are reached in such a timed sequence as to provide an optimal path to the ultimate desired state.

Servomotor motion control systems can be considered to consist of six functional components; namely, a supervisory subsystem or controller, a motion generation component (profile generator), a position controller, a motor driver (amplifier), an electric motor having armature-position control capability, and an armature-position feedback subsystem, all except the motor being implemented by electronic data processing means (and having of course such electronic and mechanical components as are appropriate). Functionally, the supervisory subsystem serves to provide overall control for the motion control system, in response to external signals that it receives; it is the component that initiates motion based upon such commands. The profile generator calculates the desired position for the motor armature, and generates signals representative of the commanded positions. Torque in the motor is controlled by the position controller, done in such manner as to keep the actual motor armature position as close as possible to the correct, or desired, position. The motor driver uses the torque required by the position controller to generate and control the current in the motor windings, and the position feedback subsystem determines the current armature position for other components of the system. The servomotor may be of either rotary or linear character, and a suitable motor for use herein is described, for example, in Horber U.S. Pat. No. 4,687,961.

It is of course in the essential nature of a servomotor that the desired position of its armature will normally change repeatedly over a predetermined period of time. In order to determine the optimal path for the motor armature, the profile generator of the motion control system uses information that may either be generated by an external device or is entered into the system by other means. The profile generator interacts primarily with the supervisory controller and the position controller. Information from the supervisory subsystem is utilized by the profile generator to determine a desired target position (state, and deadline time) for the armature; a signal indicative thereof is passed from the profile generator to the position controller, where it is used to determine the torque and, ultimately, the electric currents that are to be generated in the motor windings for moving the armature to the correct position.

External signals, such as step and direction signals, can be used by the supervisory controller to determine a desired end position, or a set of digital or analog signals can serve that purpose directly. Configuring the supervisory controller to effect movement in a predetermined sequence provides internal processing by which the desired end position may change, usually as a function of time. The sequence of target end positions may also be varied in accordance with a combination of both predetermined data (i.e., programming) and also external signals that may control the timing of movement, the sequence, or both.

Conventional profile generators function by simply evaluating a known equation that defines, as a function of time, the required position, the velocity, or both. The coefficients of the several terms of the equation are usually determined at the start of a motion path, given the initial and desired final states (e.g., position, velocity, acceleration, and rate of change of acceleration) of the system. If the desired end state changes, however, then the coefficients must be recalculated based on each new set of conditions. In addition, since the equation is evaluated on a current-time basis, a conventional profile generator must consider not only the time remaining (which it will need in order to determine when the motion has ended) but also the time since the start of the motion (or the time relative to some reference time).

Servomotor motion control systems are desirably capable of operating in each of several modes. When the supervisory controller changes the target state in a sequence based upon time, so-called "pre-calculated motion" (a simple extension of point-to-point motion) is afforded. Thus, a set of intermediate targets are pre-calculated, and at the correct times the target is changed to the next target state in the program.

Systems may be said to be in a "filtered motion" mode when the supervisory controller changes the target position, velocity, and (where required) acceleration based on input signals, but keeps the target time constant (i.e., the supervisory controller either does not let the time decrease, or causes it to decrease based upon some parameter, or combination of parameters, other than the elapsed time).

A "tracking mode" of operation occurs when the supervisory controller changes the target position, velocity, and (where required) acceleration based input signals, and either allows the time to decrease to zero (achieving tracking) or to remain at zero (maintaining tracking). Thus, this mode of operation is equivalent to a filtered operation mode in which the filter time is zero.

Finally, in synchronization modes of operation (which represent a further refinement of the tracking mode), position, velocity, and (where required) acceleration are based upon input signals. A time signal is also employed, which is controlled so as to ensure that the target will be reached when the input signals are in a predetermined state; i.e., the motion control system will synchronize its state with that of the external signal.

In a typical application, a required path, or sequence of paths, is calculated by the motion control system based upon a given set of motions, which may be defined by either a sequence of required states or by one or more established mathematical relationships. Given the path requirements, the profile generator must generate the individual motions between the required states or along the specified paths. The requirements for either a path or a sequence of paths are however equivalent, since it is always possible to use a given mathematical relationships to calculate a set of required states, or control points. In general, if the required velocity-time relationship is complex, then it can be approximated to any required accuracy by a series of simpler velocity-time relationships; the simpler relationships used are often parabolic or cubic velocity-time relationships.

There are many algorithms that are capable of determining and calculating, in advance, the relationship that is required to change the system from an initial state to a target state, following a parabolic or cubic velocity-time path. These algorithms result in a set of equations that can be used to calculate the required position or velocity of the system, or both, at any given time. The feature that is common to in all of these conventional algorithms is a requirement for two sets of calculations, which must be performed before the motion is started.

More particularly, a first set of calculations must be made to determine the equations that can, in turn, be used to calculate the required position and/or velocity during the motion. The second set of calculations determines the required position and/or velocity of the system at a given time, which is done by evaluating, at each control point, the equations that are determined by the first set of calculations. Equation evaluations must be carried out before the given time is reached; they can be performed either prior to commencement of the motion, with the results being stored for use during the motion, or by making evaluations at each control point during the motion.

The requirement for such pre-calculated motion entails a number of significant disadvantages: Firstly, no consideration can be given to any errors that might be caused as a result of the system failing to follow the predetermined path, as may be due, for example, to unexpected external conditions that change the capabilities of the system and make the precalculated motion physically impractical or impossible. Secondly, the controlling system must maintain information about the progress of the motion, either for use in evaluating the predetermined equation or to determine which data values are to be used. And thirdly, accuracy of the motion is entirely dependent upon the accuracy of the initial calculation, and thus will always entail inherent limitations; achieving requisite accuracy can be especially problematic in situations in which the equations involved are evaluated during the motion for each successive point. Errors introduced by the calculations may of course be cumulative, thus requiring additional attention (and additional calculation) in order to prevent accumulated error from affecting system performance significantly, and in any event the time needed for carrying out calculations may be significant, and would be particularly so where there are a large number of points on the path. The latter implies either that all motion must be calculated before starting an operation (which will delay initiation), or that the calculations must be performed during operation (which requires that they be complete before the control point time is reached). All of the foregoing considerations normally give rise to the use of powerful and expensive, high-capacity hardware and/or software, so as to afford the levels of speed and accuracy that are required for adequate performance of the system.

The present technique is an application of state variable control technology. It will be appreciated that such technology is broadly known and is widely used for industrial control purposes (e.g., for control of nuclear reactors, chemical plants, etc.).

SUMMARY OF THE INVENTION

Accordingly, it is a broad object of the present invention to provide a method for controlling the motion of an electric servomotor armature (rotary shaft, or linear), in which method the amount of calculation necessary to generate the desired path position or positions is relatively low.

A related object of the invention is to provide such a method in which continuously varying armature path requirements can be dealt with readily, and on a real-time basis.

An additional broad object of the invention is to provide a servomotor motion control system, characterized as a general purpose programmable position control system, by which desired armature positions can be generated with a relatively low level of calculation power and capacity, and on a real-time basis.

A related object is to provide a system that affords the foregoing features and advantages, which may be less complex and less expensive than conventional motion control systems that are presently available or known in the art.

It has now been found that certain of the foregoing and related objects of the invention are attained by the provision of a novel method in which the motion generation component of a servomotor operating system iteratively carries out the following steps, effected in sequential cycles that are spaced from one another by a delay time having a value $t_D$:

(a) receiving current state signals that are representative of the current position "P" and the current velocity "V" of the armature, and the current time "T" (normally, the real time);

(b) receiving target state signals that are representative of a desired armature position "$P_T$", a desired armature velocity "$V_T$", and a target time "$T_T$" for achieving a desired position and desired velocity;

(c) calculating the remaining armature travel distance "D" required to achieve the desired position, equal to $P_T$–P, using the current and target state signals;

(d) calculating the remaining time "t", equal to $T_T$–T, using the current and target state signals;

(e) calculating the acceleration "a" required to achieve the state represented by the target state signals, where "a" is equal to the quantity $(6D/t-2V_T-4V)/t$;

(f) calculating the sum of the current velocity V, added to the product of the acceleration a and the delay time $t_D$, to determine a commanded velocity "$V_{NEW}$";

(g) calculating the sum of the current position P, added to the product of the commanded velocity $V_{NEW}$ and the delay time $t_D$, to determine a commanded position "$P_{NEW}$"; and (h) generating signals indicative of the commanded velocity and the commanded position for use in the operating system for supplying electric current to effect movement of the motor armature. In defining the armature travel path, the motion generation component does not employ a signal, or information, that is representative of any prior state of the armature, nor does it make inquiry as to changes in the state of the armature from a state prior to the current state. The parameters applied must of course be variable by the user.

Other objects of the invention are attained by the provision of a servomotor motion control system, characterized as a general purpose programmable position control system, which comprises an electric motor having armature-position control capability; and an operating system for supplying electric current to the motor, iteratively controlled to have a cycle with a delay time of value $t_D$, for effecting movement of the armature to desired positions. The operating system includes a motion generation component that is constructed to carry out, during each cycle of the operating system, the sequence of steps described above to thereby define an armature travel path comprised of the desired armature positions, taken cumulatively.

DETAILED DESCRIPTION OF THE PREFERRED AND ILLUSTRATED EMBODIMENTS

Figure 1:
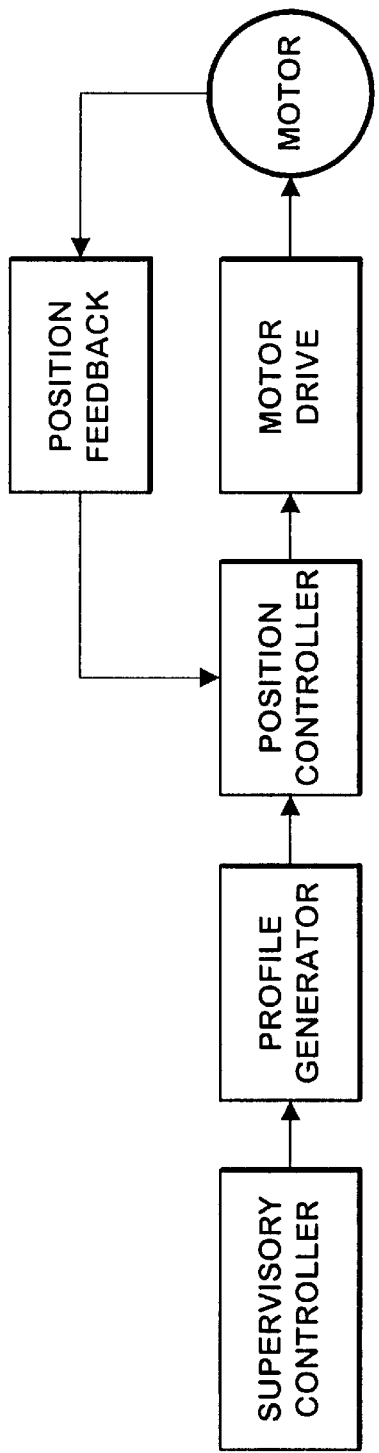
FIGS. 1 and 2 of the drawings are block diagrams showing the components of a motion control system embodying the present invention, electrically configured for operation of the profile generator (motion generation component) in open loop and closed loop modes, respectively.
Figure 2:
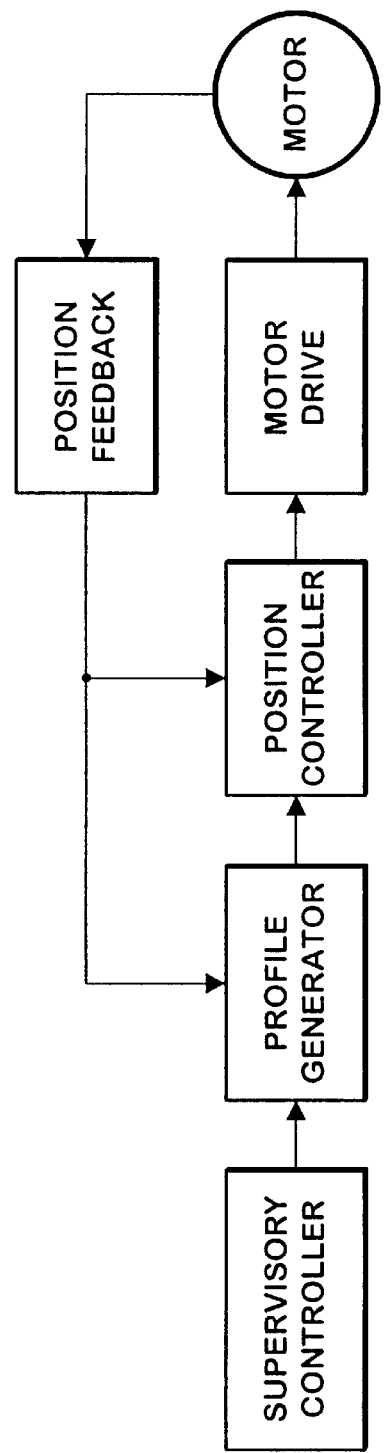

The blocks comprising FIG. 1 depict the components of a motion control system embodying the present invention, in an open loop configuration. As can be seen, as so configured the system is characterized by having the feedback signal from the motor provided only to the position controller. In the closed loop component configuration of FIG. 2, the feedback signal is provided to the profile generator as well as to the position controller. The implications of these system configurations will be discussed more fully hereinbelow.

Figure 3:
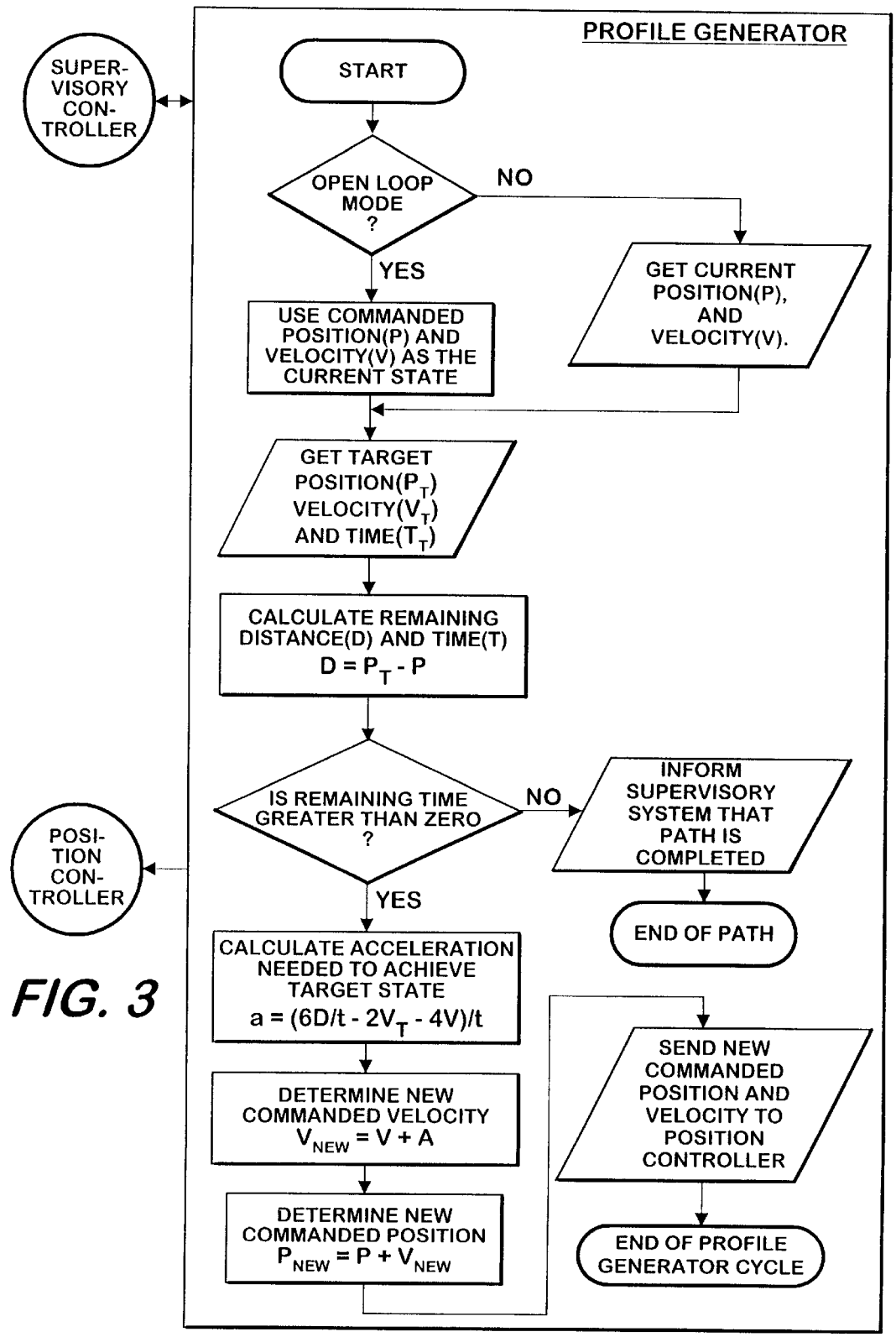
FIG. 3 is a functional flow diagram showing the sequence of steps carried out by the profile generator during each cycle of operation in which a desired position is determined for the armature of the motor of the system of FIGS. 1 and 2.

FIG. 3 shows the functional steps that are performed by the recursive profile generator of the invention, normally during each cycle, once operation is initiated by the supervisory controller. Typically, the cycle time will be about 0.5 millisecond and, as a practical matter, should not exceed about 5.0 milliseconds. Depending upon whether or not the control system is in its open loop mode, the profile generator determines the current state of the motor; it does so by using either the prior commanded position velocity (in the open loop mode) or (in the closed loop mode) feedback signals that are representative of the actual state parameters.

After obtaining information as to the applicable target state position and velocity, and the real time, the profile generator calculates the remaining distance to be traveled by the armature, and the time remaining for doing so. If the latter value is not greater than zero, the end of the path is indicated and the supervisory controller is so informed.

If, on the other hand, the remaining time shows a positive value, the profile generator proceeds to calculate the acceleration needed to achieve the target state (by application of the equation set forth, which is, of necessity, a convergent algorithm), and to determine a new commanded position and a new commanded velocity for the armature. Those values are provided to the position controller and, unless the supervisory controller dictates otherwise, the cycle is repeated to attain the end of the path. As will be appreciated by those skilled in the art, the supervisory controller impresses the cycle delay time $t_D$, the value of which may vary from cycle-to-cycle.

As will also be appreciated, the instant profile generator uses a recursive algorithm to calculate the "optimal" action that is necessary to cause the motor armature to reach a defined position and velocity (and possibly to also reach a defined acceleration) at a known future time (the target state), given the current state of the system (i.e., the current position and velocity of the armature, and possibly its acceleration as well). The recursive profile generator inherently requires no knowledge of the previous state of the system, nor does it depend upon the target state of the system remaining constant over time; these are unique and essential attributes of the general purpose position control system and method described herein. Because of these features, both the current state and the target state may be varied without affecting the operation of the profile generation component.

If information on previous system states, or on changes to the target state, is available, it may be used in generating the signals that the supervisory controller supplies to the profile generator; the information is not however used by the profile generator itself in the present system.

The described profile generator embodiment defines the state of the system in terms of the position and velocity of the motor armature at a specific time. Thus, the action determined by the profile generator (using the parabolic algorithm herein set forth) is the acceleration that will be required to produce the desired end state. The operative algorithm, and hence the profile generator itself, may however be extended to a higher order equation so as to take acceleration (or indeed higher order terms) into account as a feature by which the state is defined (and is therefore to be controlled). As a general principle, it will be appreciated that the calculation must use the term that is one order higher than the highest order state that is to be determined; e.g., if acceleration is to be taken into account, the action calculated by the algorithm will be the required "jerk" (rate of change of acceleration only). Where acceleration is required, the optimal action will generate a parabolic velocity-time relationship if the target state is fixed; within the constraints of the particular algorithm disclosed, this motion can be produced with the minimum amount of power to reach the target state. If acceleration is included in the state definition, however, then the motion would follow a cubic velocity-time curve.

As indicated above, the current system state of the motor may be considered to be either the measured or feedback state (characteristic of the "closed loop" configuration) or it may be the desired state of the system (the "open loop" configuration). The open loop mode of operation is closer to that of a conventional profile generator where, at each cycle, the new, desired state is based on the previous desired state; again, however, the instant profile generator takes the previous commanded state to be the current system state, and utilizes it as such.

Target state information can also be based either upon signals that are generated external to the profile generator, or upon the previous target state. In the situation in which the current target state is based upon the previous one, the change is assumed to be only in the time remaining until the target state is reached. Such "point-to-point" motion represents a special case for the recursive profile generator, in which more computation power may be required than would be necessary utilizing a standard profile generator; it is significant however that the instant profile generator handles such a case without special processing. It is also to be noted that, in the present system, changes in the position, velocity and, where applicable, acceleration at the target state are assumed to be made only by the supervisory controller, either in response to external signals or in a predetermined sequence.

Determinations of the current and target states of the system will vary, depending upon which features of the profile generator are desired. The operations and the alternatives are as follows:

For the simplest open loop operation, the current state is taken as the commanded state, as determined for the previous cycle. In this situation the profile generator does not consider the actual position of the system; that is done by the position controller, which functionally follows the profile generator. The path of the motion (time sequence of commanded states) can, in this case, be easily determined given the initial and target positions.

For closed loop operation the current state is the actual state of the system, which must be determined by considering the feedback in the system. In this situation the profile generator will be affected by, and will assist, the position controller.

Insofar as concerns the determination of desired target states, for point-to-point motion the desired target will simply be a fixed state, which will usually be generated either by an external system or by an operator, and entered into the system before motion is started. When the target is reached, the system will either request, or await, a new target.

In cases in which motion is pre-calculated, and the motion path is significant, the target will constitute a sequence of states that are either calculated or entered into the system, before the motion is commenced or as it is occurring. When the target is reached the system will automatically select the next target in the sequence, until all targets in the sequence have been attained.

For filtered motion, in which the profile generator is used to "assist" the position controller, the target may change before the previous target is reached. The change in the target may be either external (where the target is obtained from an external system) or internal (where the target is calculated, or a sequence of targets is pre-loaded into the system). In the filtered motion case there will generally be a fixed time (the filter time constant) between the current and the target states, which does not change during operation.

In a tracking mode of operation the desired function is to follow an external signal, or signals; the target may be determined from a set of inputs, and may or may not require some calculation. This mode may effectively reduce to a filtered motion operation in which the target is input directly and a delay is allowed between the input time and the time the system reaches the target state.

Finally, where the controlled operation is to be synchronized with an external motion (i.e., a synchronization mode), the system may also base the target not only upon the external signals but also upon some internal historical information as well. An example is where an input speed is used to calculate the time at which the input position will reach a given value, so that the target state can be reached at the same time.

Among the major advantages of the instant system is its self-correcting character, which results because the profile generator does not rely upon any information about previous motion in attaining the target position. Even when the system operates in an open loop mode it uses only the commanded state of the previous iteration, which means that any longer term errors are "forgotten" and will be corrected by the algorithm. Another major advantage is that the system will track a varying target state without additional computation, thus allowing the profile generator to operate without requiring the target to remain fixed.

It should be appreciated that the errors referred to hereinabove may be: (a) errors in measurement of the external signals or caused by noise in the external signals, (b) errors in the calculations of the previous commanded position caused by limited arithmetic precision of the computer and software, or (c) errors due to the system not reaching the previous desired position. Errors designated (a) and (b) are handled directly by the algorithm; error (c) is handled by the closed loop implementation of the algorithm.

A fundamental feature of the present system resides in the characteristic of the profile generator by which it applies the functional algorithm freshly to the data that are supplied at each control instant. Thus, the determination of control signals depends only upon current and final states, and not upon either the history of previous movement or upon any intermediate states. Since it effects a reevaluation of the path remaining at each control instant, the profile generator automatically compensates for any difference that might exist between the actual current state (i.e., the true state of the system) and the desired current state (i.e., the state that the controller estimates, based upon the commanded values).

Because of these unique features, the calculations that are required for operation of the profile generator are simplified, since they do not have to compensate for any accumulation of error over the time that elapsed since initiation of the motion. The ability to ignore the previous state information, when calculating the new, commanded state, means that any errors involved in calculating the previous state are not included in the new calculations. Moreover, because only the current and target states are considered, the system does not rely upon the target remaining constant, and does not need to explicitly consider any changes in the target.

Since the determination of the equations in the conventional profile generator, on the other hand, depends upon the initial state as well as the final state, changing the target (i.e. the final state) requires a different set of equations, in turn requiring that the first set of calculations be reevaluated whenever the target changes. Not only must considerable additional calculation be carried out, therefore, when the target changes, but moreover the conventional profile generator must include routines that either check for changes in the target, and perform the necessary calculations, or that prevent changes to the target from being considered until the motion is complete.

The advantages inherent in the present system extend to situations in which the system is tracking an external parameter, e.g. velocity, where it may not be possible to precalculate the motion because the parameter is varying unpredictably. Since, once again, the action of the present system depends only upon the current and target states, there is no substantive difference between a system with a fixed target state and one in which the target is changing. The only limitation is that the target be physically achievable, given the limitations of the system.

The system described herein may also be extended to tracking applications in which the target is constantly shifted to lie ahead of the current time, by a filter-time constant. This will allow the system to handle sudden changes in the commanded position, by "delaying" the change by the filter time; from the standpoint of the position controller, therefore, the system has the filter time over which to change position. This effect, of limiting the change in the commanded position, can also be adjusted to limit the commanded torque (and acceleration) to fall within the specifications of the motor system, without having the error in position cause problems with system response when the position controller saturates.

Thus, it can be seen that the present invention provides a novel method for controlling the motion of an electric servomotor armature, in which method the amount of calculation necessary to generate the desired path position or positions is relatively low, and in which continuously varying armature path requirements can be dealt with readily, and on a real-time basis. The invention also provides a general purpose programmable position control system by which desired armature positions can be generated, without knowing a priori what the range of motion or the system dynamics are, with a relatively low level of calculation power and capacity, and on a real-time basis. The instant system uniquely employs a state controller as a recursive profile generator, and may be less complex and less expensive than conventional motion control systems that are presently available or known in the art.

Having thus described the invention, what is claimed is:

1. A method for controlling the motion of an electric servomotor having an armature with armature-position control capability, utilizing an operating system for supplying electric current to the servomotor, the system being iteratively controlled to have a cycle, with a delay time of value $t_D$, for effecting movement of the armature to desired positions, and including a motion generation component for defining an armature travel path comprised of said desired positions taken cumulatively; characterized in that the motion generation component carries out the following steps during each cycle of the operating system:

(a) receives current state signals that are representative of the current position "P" and the current velocity "V" of the armature, and the current time "T";

(b) receives target state signals that are representative of a desired armature position "$P_T$", a desired armature velocity "$V_T$", and a target time "$T_T$" for achieving said desired position and desired velocity;

(c) calculates the remaining armature travel distance "D" required to achieve said desired position, equal to $P_T$–P, using said current and target state signals;

(d) calculates the remaining time "t", equal to $T_T$–T, using said current and target state signals;

(e) calculates the acceleration "a" required to achieve the state represented by said target state signals, where "a" is equal to the quantity $(6D/t - 2V_T - 4V)/t$;

(f) calculates the sum of said current velocity V, added to the product of said acceleration a and said delay time $t_D$, to determine a commanded velocity "$V_{NEW}$";

(g) calculates the sum of said current position P, added to the product of said commanded velocity $V_{NEW}$ and said delay time $t_D$, to determine a commanded position "$P_{NEW}$"; and (h) generates signals indicative of said commanded velocity and said commanded position for use in said operating system for supplying electric current to effect movement of said motor armature; said motion generation component functioning without utilizing any signal that is representative of any prior state of said armature, and without making inquiry as to changes in the state of said armature from a state prior to the current state.

2. The method of claim 1 wherein said motion generation component carries out the additional step of determining whether said operating system is configured for open loop or closed loop operation.

3. The method of claim 2 wherein said motion generation component determines that said operating system is configured for closed loop operation, and wherein said current state signals are representative of the actual state of the servomotor armature.

4. The method of claim 2 wherein said motion generation component determines that said operating system is configured for open loop operation, and wherein said current state signals are representative of the immediately prior commanded state of the servomotor armature.

5. A servomotor motion control system comprising: an electric motor having an armature, with armature-position control capability; and an operating system for supplying electric current to said motor, iteratively controlled to have a cycle with a delay time of value $t_D$, for effecting movement of said armature to desired positions, said operating system including a motion generation component that is constructed to carry out the following steps during each cycle of said operating system, and thereby to define an armature travel path comprised of said desired positions taken cumulatively:

(a) receiving current state signals that are representative of the current position "P" and the current velocity "V" of said armature, and the current time "T";

(b) receiving target state signals that are representative of a desired armature position "$P_T$", a desired armature velocity "$V_T$", and a target time "$T_T$" for achieving said desired position and desired velocity;

(c) calculating the remaining armature travel distance "D" required to achieve said desired position, equal to $P_T$–P, using said current and target state signals;

(d) calculating the remaining time "t", equal to $T_T$–T, using said current and target state signals;

(e) calculating the acceleration "a" required to achieve the state represented by said target state signals, where "a" is equal to the quantity $(6D/t - 2V_T - 4V)/t$;

(f) calculating the sum of said current velocity V, added to the product of said acceleration a and said delay time $t_D$, to determine a commanded velocity "$V_{NEW}$";

(g) calculating the sum of said current position P, added to the product of said commanded velocity $V_{NEW}$ and said delay time $t_D$, to determine a commanded position "$P_{NEW}$"; and (h) generating signals indicative of said commanded velocity and said commanded position for use in said operating system for supplying electric current to effect movement of said motor armature, said motion generation component being devoid of a capability of utilizing any signal that is representative of any prior state of said armature, and being devoid of a capability of inquiry as to changes in the state of said armature from a state prior to the current state.

6. The system of claim 5 additionally including a supervisory controller component and a position feedback component, said supervisory controller component and said feedback component being operatively connected for providing such current state signals to said motion generation component in open and closed loop modes of operation, respectively, said motion generation component being constructed to determine whether said system is configured for open loop or closed loop operation, and to accordingly receive said current state signals from said supervisory controller component or said feedback component, respectively.

7. The system of claim 6 additionally including a position controller component and a motor driver component, said position controller and motor driver components being operatively interconnected to one another, and to said motion generation component and said electric motor, for supplying electric current to said motor for generating torque values therein appropriate for moving said armature to said commanded position at said commanded velocity.

* * * * *